US007188096B2

(12) United States Patent
Mazner et al.

(10) Patent No.: US 7,188,096 B2
(45) Date of Patent: *Mar. 6, 2007

(54) METHOD FOR SELECTING TERMS FROM VOCABULARIES IN A CATEGORY-BASED SYSTEM

(75) Inventors: Jeremy Scott Mazner, Seattle, WA (US); William James Griffin, Redmond, WA (US); Deana R. Fuller, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/996,942

(22) Filed: Nov. 24, 2004

(65) Prior Publication Data

US 2005/0097098 A1 May 5, 2005

Related U.S. Application Data

(60) Continuation of application No. 10/683,422, filed on Oct. 10, 2003, which is a division of application No. 09/538,020, filed on Mar. 29, 2000, now Pat. No. 6,658,406.

(51) Int. Cl.
*G06F 17/30* (2006.01)

(52) U.S. Cl. ....................................................... 707/1

(58) Field of Classification Search ..................... None
See application file for complete search history.

(56) References Cited

U.S. PATENT DOCUMENTS

| 5,708,822 | A * | 1/1998 | Wical ............................ 704/1 |
| 6,226,632 | B1 * | 5/2001 | Takahashi et al. ............. 707/3 |
| 6,434,551 | B1 * | 8/2002 | Takahashi et al. ............. 707/3 |
| 6,449,627 | B1 * | 9/2002 | Baer et al. ................... 715/514 |
| 6,466,654 | B1 * | 10/2002 | Cooper et al. ........... 379/88.01 |
| 6,487,545 | B1 * | 11/2002 | Wical ........................... 706/45 |
| 2002/0083039 | A1 * | 6/2002 | Ferrari et al. .................. 707/1 |
| 2004/0111438 | A1 * | 6/2004 | Chitrapura et al. ......... 707/200 |

* cited by examiner

*Primary Examiner*—Diane Mizrahi
(74) *Attorney, Agent, or Firm*—Woodcock Washburn LLP

(57) ABSTRACT

A system and method for categorizing a document in a document management system, wherein said document management system comprises a tree of nodes, and enables a document to be categorized in a plurality of nodes. Each node has a category label indicative of a document category. Unique vocabulary terms are listed wherein each vocabulary term represents only one node in the tree and comprises that node's category label. A checkbox is provided for each of the vocabulary terms whereby a user may select one or more vocabulary term by checking a corresponding checkbox. From the checked terms, a set of vocabulary terms is generated for associating a document with all of the nodes corresponding to the selected vocabulary terms.

7 Claims, 8 Drawing Sheets

METHOD FOR SELECTING TERMS FROM VOCABULARIES IN A CATEGORY-BASED SYSTEM

CROSS REFERENCE TO RELATED APPLICATIONS

This application is a continuation of U.S. patent application Ser. No. 10/683,422, entitled "Method For Selecting Terms From Vocabularies In A Category-Based System," filed Oct. 10, 2003, which is a divisional of U.S. patent applicaton Ser. No. 09/538,020, filed Mar. 29, 2000, entitled "Method For Selecting Terms From Vocabularies In A Category-Based System," now U.S. Pat. No. 6,658,406, both of which are herein incorporated by reference in their entirety.

TECHNICAL FIELD

The present invention relates generally to systems and methods for managing, selecting, and adding terms from large lists of terms. More particularly for use in managing and selecting document categories from a list of category terms for use in document management.

BACKGROUND OF THE INVENTION

As the amount of information stored by computer systems continues its exponential growth, companies are developing sophisticated information organization methods to aid users in both the storage and retrieval of that information. For example, the simple hierarchical file storage methods wherein files are stored within nested layers of folders makes the task of retrieving files difficult as the number and variety of stored files grows. This difficulty is compounded when files are stored and shared across groups of users, companies, organizations, and so on. Newer techniques, such as those used by document management systems, Intranet systems, Internet systems, etc., often supplement or supplant the simple, hierarchical file system with a category-based approach. Unlike the simple, hierarchical file systems, category-based systems are organized as a tree structure having many category nodes. Documents are indexed in multiple categories so that they may be found by way of multiple category nodes. As a result, different users can locate the same file while applying different logic in their respective searches for the file.

However, while such systems simplify the retrieval of documents, they may add complexity when storing and categorizing documents. For instance, in order for readers/browsers to be able to easily find a previously created document, it should be locatable in a number of different categories, e.g., a document may be categorized by document type (specification, manual, etc.), by content type, by project, and so on. It is advantageous if the creator/editor/author of the document can provide input about the proper categorization, as those most familiar with the content are most likely to accurately judge which categorization is most relevant. In order for the author to participate and for the categorization to be meaningful, the categorization process should be as easy and as comprehensive as possible. But as a particular document system grows in complexity and number of categories, the categorization task can become daunting. The present invention provides a system and methods that address the shortcomings of previous systems.

SUMMARY OF THE INVENTION

Along with these newer organizational techniques, categorization tools are necessary to ease the burden of properly indexing a document across multiple categories. To that end, the invention provides users with the tools to quickly tag a document with indexing information (metadata) to make the document easier to locate. To facilitate decentralized document management, an author of a document is encouraged to categorize the document (e.g., at the time of document creation). The present invention provides a user interface that permits the user to quickly and efficiently select all or many of the relevant categories into which the document should be indexed. The invention provides the user with tools to search and select predefined category paths from a large list of such paths.

The system and method facilitates user categorization of a document into a plurality of categories by displaying a list of vocabulary terms, each term representative of a category. A check box associated with each vocabulary term is displayed alongside each term. A user than indicates acceptance of vocabulary terms by selecting its check box. All of the selected terms are provided for association of the document with each category whose corresponding vocabulary term was selected. In this way, a user can quickly and efficiently cause a document to be associated with many relevant categories and thereby aid in later location and retrieval of the document.

According to an aspect of the invention, finding relevant entries in the list of vocabularies is aided by the use of search strings and dynamic filtering. By entering a string, e.g., "win", the user is presented with a list of all category paths matching (case-insensitive) the regular expression "win" anywhere in the string. In this way, the set of all categories can be quickly filtered to a smaller subset that contains the text of interest.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention should not limited to the specific methods and instrumentalities disclosed. In the drawings.

DETAILED DESCRIPTION OF THE INVENTION

Overview

The present invention addresses the need for a system and method for categorizing documents so that the document can be more easily shared, located, and retrieved. To aid in the location and retrieval of documents, it is useful to both add information (e.g. search terms) to the document to enhance searching and to categorize the document into a plurality of categories. Moreover in document management systems, it is useful to predefine both the information to be added to the document (i.e., the metadata schema) and the categories. In this way, users of the system add documents to the system in a consistent fashion. According to the invention, the information to be added and the categories of the documents are presented to the user as text strings.

Lists of such text strings are referred to herein as vocabularies. In the case of categories, the vocabulary is unique because its list of terms actually represents a hierarchy. The vocabulary corresponding to the hierarchy is constructed by pre-pending the full path to each node. For example, the vocabulary Projects:Software:Windows represents the path to the category node Windows. For any given document management system, there may be hundreds of such category nodes. The invention aids a user in selecting relevant category node values from long lists of such vocabularies.

Existing user interfaces for choosing list items use a simple heuristic for helping users find a particular item. For example, the list may be sorted alphabetically, and as the user types in the letters of the item they wish to find, the interface scrolls to the closest matching items in the list. This heuristic fails for hierarchical values (such as a category vocabulary), because the alphabetical sorting would group items based on their shallowest, or top-most, parent in the hierarchy. Users, on the other hand, will most often be interested in the deepest, or bottom-most, items in the hierarchy. Using the example above, a user looking for the category "Windows" will most likely type "Windows", rather than "Projects:Software:Windows".

Exemplary Operating Environment

1. A Computer Environment

Figure 1:
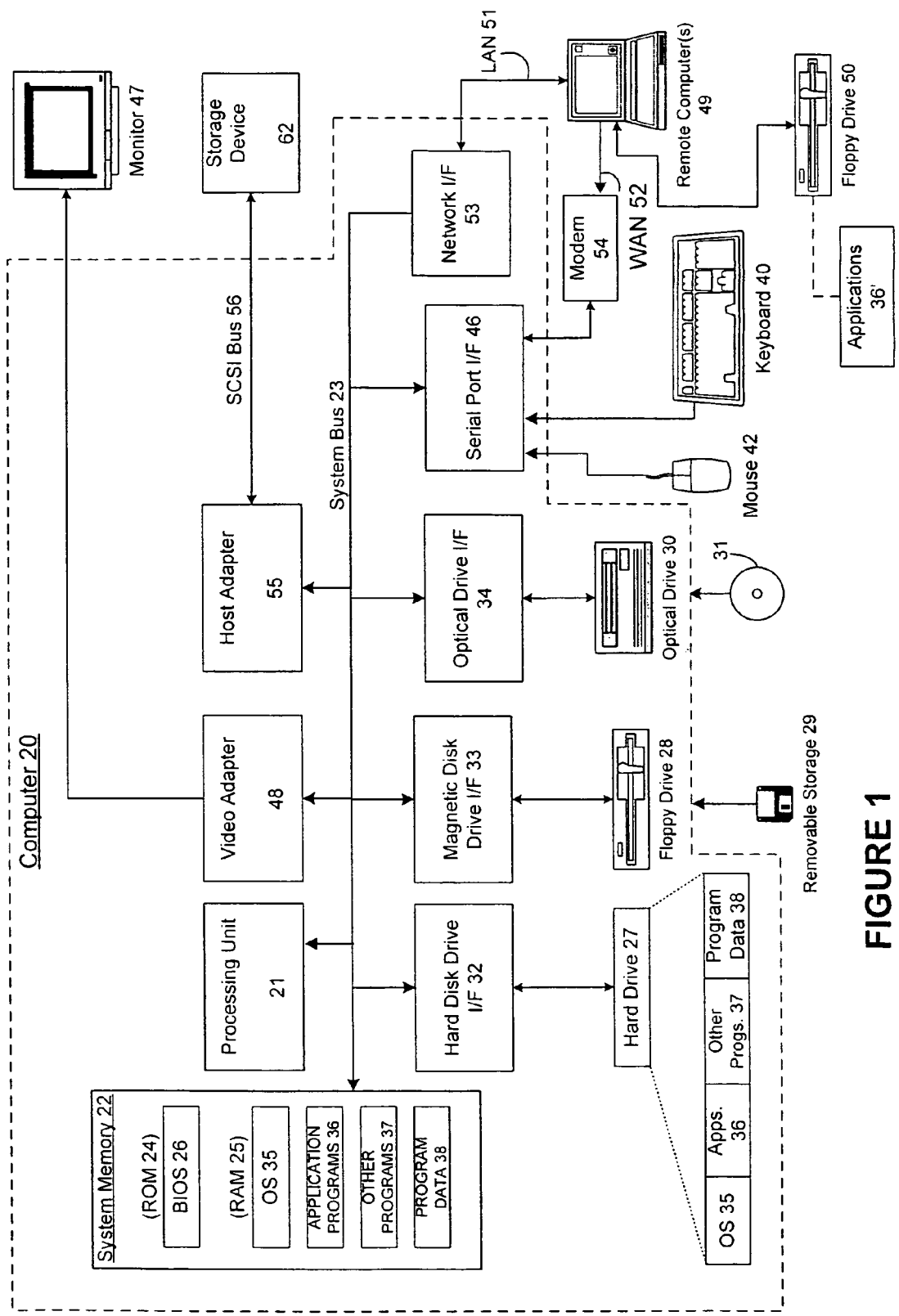
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
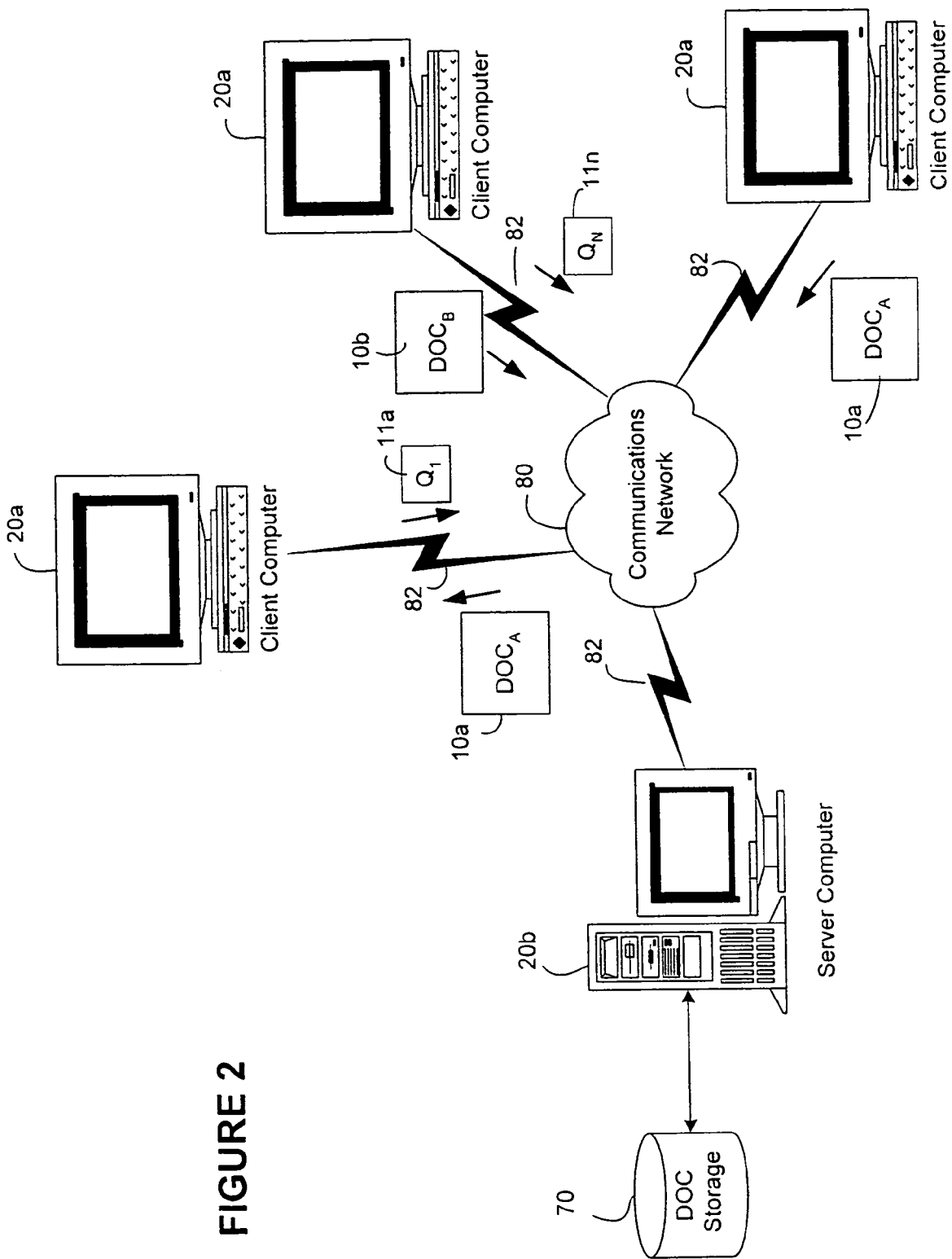
FIG. 2 is schematic diagram representing a network computer model in which aspects of the present invention may be incorporated.

FIG. 2 illustrates an exemplary environment in which the present invention may be employed. Of course, actual environments can be arranged in a variety of configurations; however, the environment is shown here in the context of a client server system to provide a framework for understanding the type of environment in which the present invention operates. The system may include client computers 20a, which could be personal computers, thin clients, hand-held computing devices, and so on. Additionally, the system may include a server computer 20b, and storage 70, which is coupled to and controlled by server computer 20b. The client and server computers communicate with each other by way of communications network 80, which may be a LAN, a WAN, intranet, the Internet, etc.

Client computers 20a and server computer 20b are connected to the communications network by way of communications interfaces 82. Communications interfaces 82 can be any one of the well-known communications interfaces such as Ethernet connections, modem connections, DLS connections and so on. Communications interfaces 82 may also be by way of an intermediate communications network such as a LAN.

According to aspects of the present invention, users of client computers 20a may generate documents (e.g., $DOC_A$ 10a, $DOC_B$ 10b) that must be stored for later retrieval for editing, viewing, and the like. The generic term user(s) is used herein to designate all users of the system; however, in practice user may be distinguished into different classes depending on his or her particular use. For example, a user may be a producer of documents (i.e., an author/editor/creator), a consumer (i.e. a reader trying to find particular documents), or both. As used herein, the term document refers to any file that contains data and can be contain text, graphics, special codes, or a combination of some or all of these. To facilitate document management, the documents generated by client computers 20a are stored in DOC storage 70 and are thus transmitted to server computer 20b over communications network 80. Server computer 20b then determines the proper storage of the documents in DOC storage 70.

In addition to the generation of documents, users of client computers 20a may also desire to share documents with other users. In order to retrieve documents generated by other users, users make requests to server computer 20b for documents stored in DOC storage 70. Server computer 20b then retrieves the requested documents and transmits them back to the requesting user's client computer 20a by way of communications network 80. As is described more fully below, the users' requests for documents may take the form of queries wherein they ask for documents having selected properties. Hence, users of client computers 20a may submit queries (e.g., $Q_1$ 11a, $Q_N$ 11n,) that are transmitted server computer 20b over communications network 80. Documents which match the selected queries are then returned to the requesting computer.

In order to facilitate document management and retrieval, it is important that as much descriptive information as is feasible to be associated with a document. According to an aspect of the invention, much of this information should be provided by the creator/editor of the document and it is best added to the document contemporaneously with its creation/edit rather than at a later time or by a person other than the creator/editor. Hence, a system for easing the burden placed on the user of adding additional information to the document at the creation/edit stage would increase the likelihood that the additional information will be associated with the document, and will further be highly relevant by virtue of being entered contemporaneously with document creation.

Figure 3:
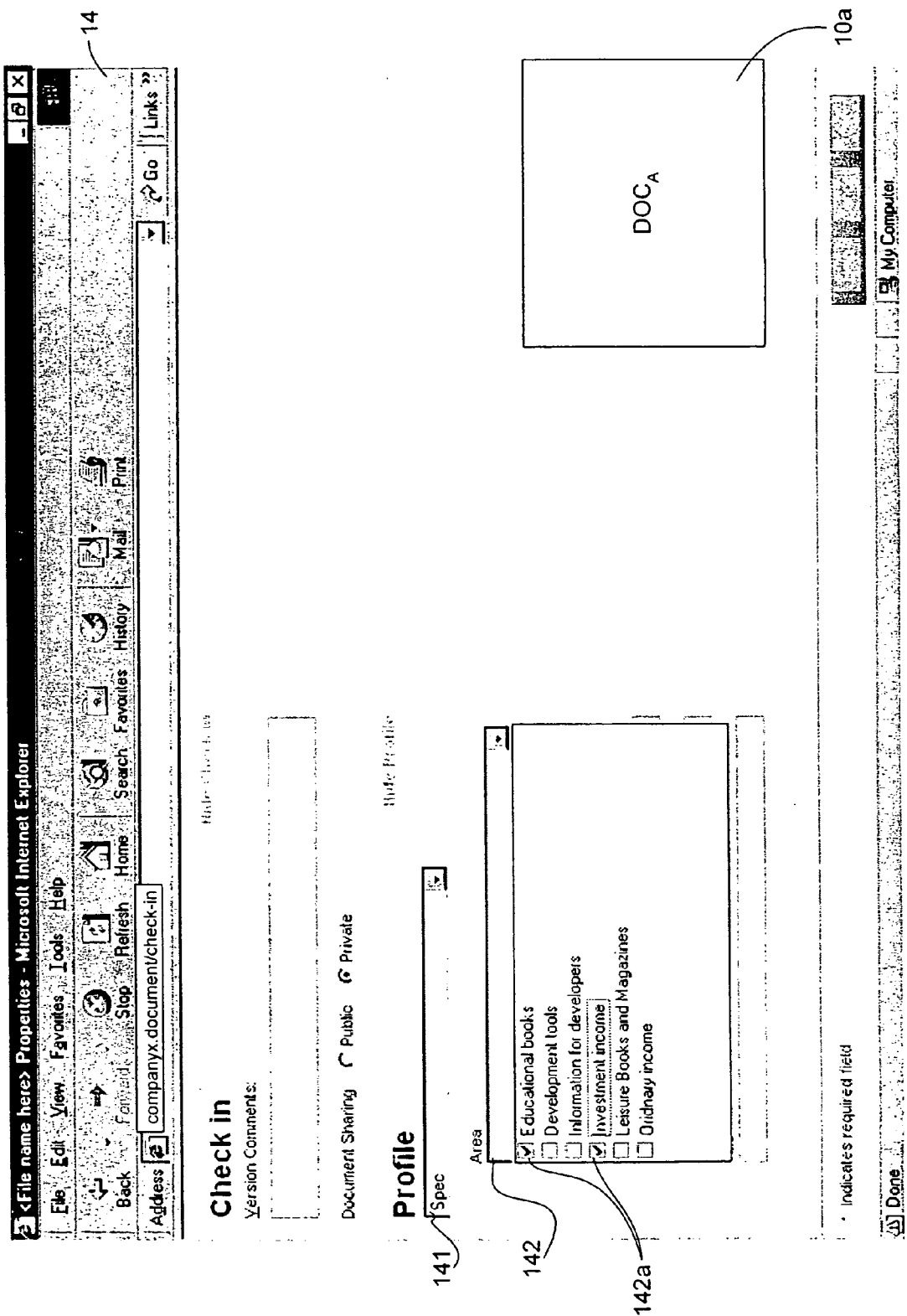
FIG. 3 is example illustration of a document and a user interface for adding information to the document.

FIG. 3 illustrates an aspect of the invention for easing the burden of adding additional information to the document. A program on a user computer 20a provides a set of input options to a user. Preferably, the user interface runs within a browser window 14 using a browser such as INTERNET EXPLORER, available from MICROSOFT CORPORATION. The user has made a request to the document management system, preferably by way of an HTTP request. The server computer 20a then sends the program of input options to the user by way of a web page such as an HTML or XML page. The example shown presents a document check-in window such as would be used to enter a document into a system after the document has been created or edited. The window 14 provides the user with several drop-down boxes (e.g., 141, 142) whereby the user can add properties to a document. Here, a document $DOC_A$ 10a was created/edited by a user, which the user would like to check into the system for storage, on server computer 20b (see FIG. 2).

After the user selects one of a predefined document profile (shown as "spec" in this example) from drop-down box 141, the user associates additional information by selecting the area drop down box 142. By selecting the area drop down box 142, the user is presented with a list of word phrases that describe aspects of the document. The user may select various ones of the areas by checking the associated checkboxes 142a.

Although it is beyond the scope of the invention, those of ordinary skill in the art will appreciate that the list of words and phrases presented, such as those presented here in area drop down box 142, can be predefined for a plurality of document profiles. A typical document management system would likely be configured by the document management administrator or similarly authorized person to define various profiles that correspond to their particular needs.

Figure 4:
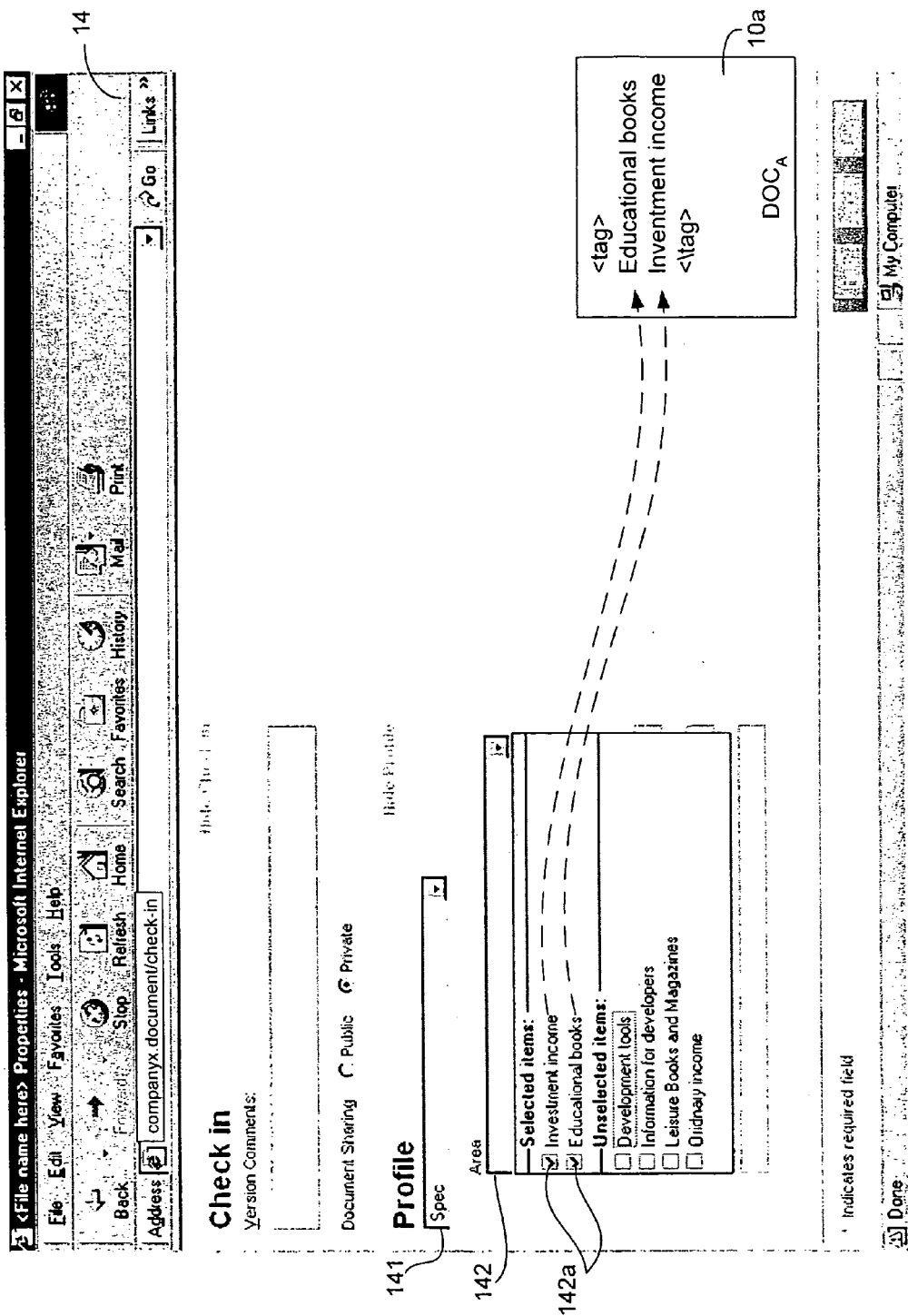
FIG. 4 is an example of selections made in the user interface of FIG. 3 of information to be added to the document.

FIG. 4 further illustrates the operation of the invention. After a user checks an area check box 142a, the selected area is moved to the top of the list, denoted here as "Selected Items." The unselected items remain in the area designated "Unselected Items." When the user is finished selecting areas, the selected areas are associated with the document. In this example, the user selected "Investment income" and "Educational books" from the list. That additional information is associated with the document $DOC_A$ 10a. By way of example, the information is physically coupled to the document as a <tag> property. The function of associating the additional information may be performed either by the client computer or the server computer, depending on the particular document management design. Notably, once the additional information is associated with the document, a user could use the additional information as an aid in querying for documents. In this example, a user submitting a query for documents containing the tags "Educational books" should locate $DOC_A$ 10a.

Figure 4A:
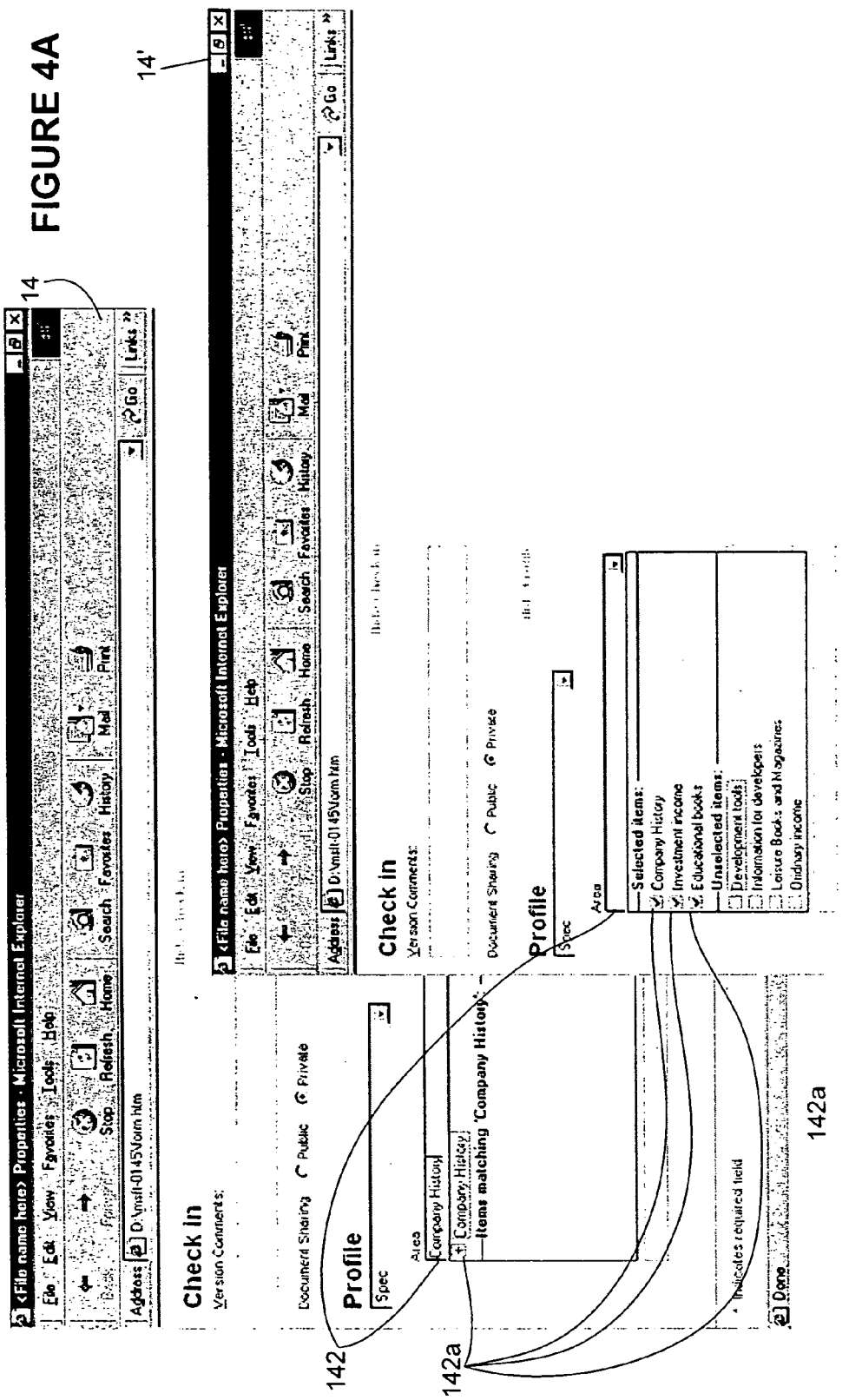
FIG. 4A is an example of adding multiple custom selections and selecting them in the user interface of FIG. 3 of information to be added to the document.

As shown in FIG. 4A, the invention contemplates the addition of the addition of custom information to the document (i.e. not predefined). Here, if for example, an author desires to add the term "Company History" as a tag in the document, the author starts typing the term into the box (e.g., 142 of window 14). When no matching terms are located in the list, a new term 142a is created. As illustrated in window 14' the new custom term is added to the list of selected terms. In this way, an author can continue adding and selecting predefined vocabulary terms and/or add additional custom terms to the list of terms to be added to the document.

In addition to adding additional information to documents to facilitate later retrieval of the documents, it is also important that a user maintain documents in locations that aid later retrieval. This could be accomplished by storing the document in multiple locations; however, this presents obvious drawbacks in maintaining the various copies of the same file. The invention overcomes this problem by facilitating the appearance of a document located in multiple locations even though the document is actually stored in one physical location.

Said another way, consider the case of a common, file-folder taxonomy wherein users maintain various hierarchical file folders. For example, a user may have folders to separate personal files from business files. Furthermore, within each of these folders, the user may further distinguish by keeping one file for each project and within each project folder a user may further organize the files by creating further distinguishing folders. When storing a file, typically, a user will choose a single folder among the various folders and place the document in that folder. If the user chooses to place a document in more than one folder, the document may be easier to locate but the integrity of the document will be questionable as it may not reflect all of the changes made to presumably identical files in other folders. This difficulty would be compounded if multiple users had access to the files.

Figure 5:
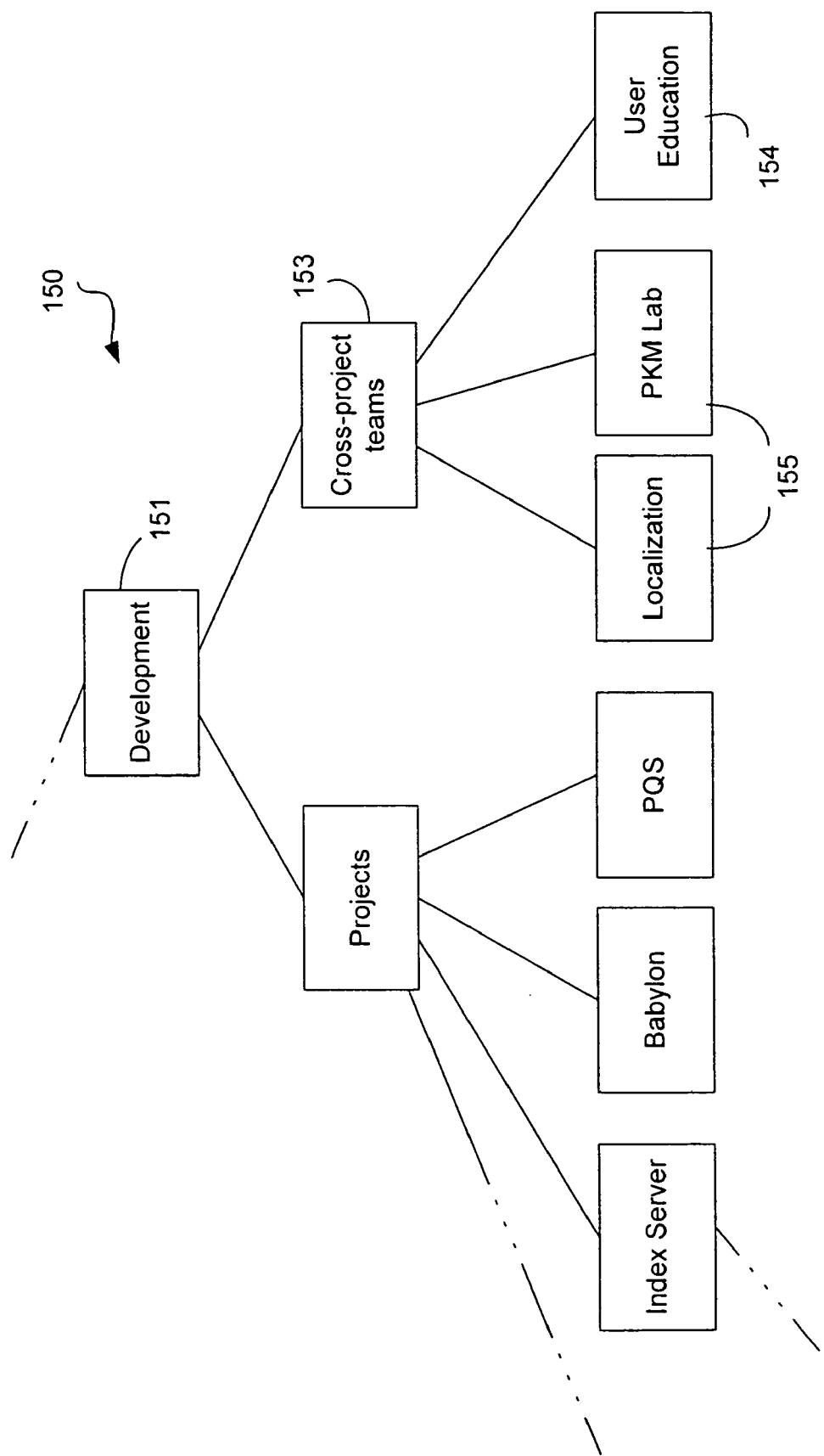
FIG. 5 is a schematic representation of an example document categorization tree.

In contrast to the file-folder taxonomy, a branch/node taxonomy provides a hierarchical taxonomy that is designed to physically store the file in one location while granting access to it through various nodes in the taxonomy. FIG. 5 illustrates example branch/node taxonomy 150. A subject node 154 represents the starting point. In the context of a document management system, subject node 154 may represent one category that should be associated with a document to be stored. A parent node 153 is a node that is one level higher (or one category broader) than subject node 154, and a grandparent node 151 is two levels higher (or two categories broader) than subject node 154. Child nodes (not shown) are nodes that are one level lower (or one category narrower) than subject node 154, and grandchild nodes (not shown) are two levels lower (or two categories narrower) than subject node 154. Sibling nodes 155 are nodes that are on an equal level with subject node 154. In addition, further levels of "great" nodes (not shown) may be present in either direction (e.g., great grandparent and great-great grandchild).

Each node is addressable according to its path in the hierarchical taxonomy. This path is created by traversing the branches connecting subject node 154 with ancestor nodes (i.e., grandparent and parent) and descendent nodes (i.e., children and grandchildren). This path, called a node path or category path, may be written in the form "grandparent:parent:subject node:child." By employing such a standard, the relation of the nodes to subject node 154 immediately is apparent, regardless of the node's displayed titles. Notably, the display may have multiple levels of grandparents (i.e., "great grandparents") as well as multiple levels of grandchildren (i.e., "great grandchildren").

The tree organization is preferably designed, employed, and controlled by a document management administrator or similarly authorized person. In this example, the tree is organized into two groups of leaves (i.e. Index Server, Babylon, and PQS in the first group and Localization, PKM Lab, and User Education in the second group). The leaves have parent nodes (i.e. Projects for the first group and Cross-project teams for the second group) and grandparent nodes (i.e. Development for both groups).

Figure 6:
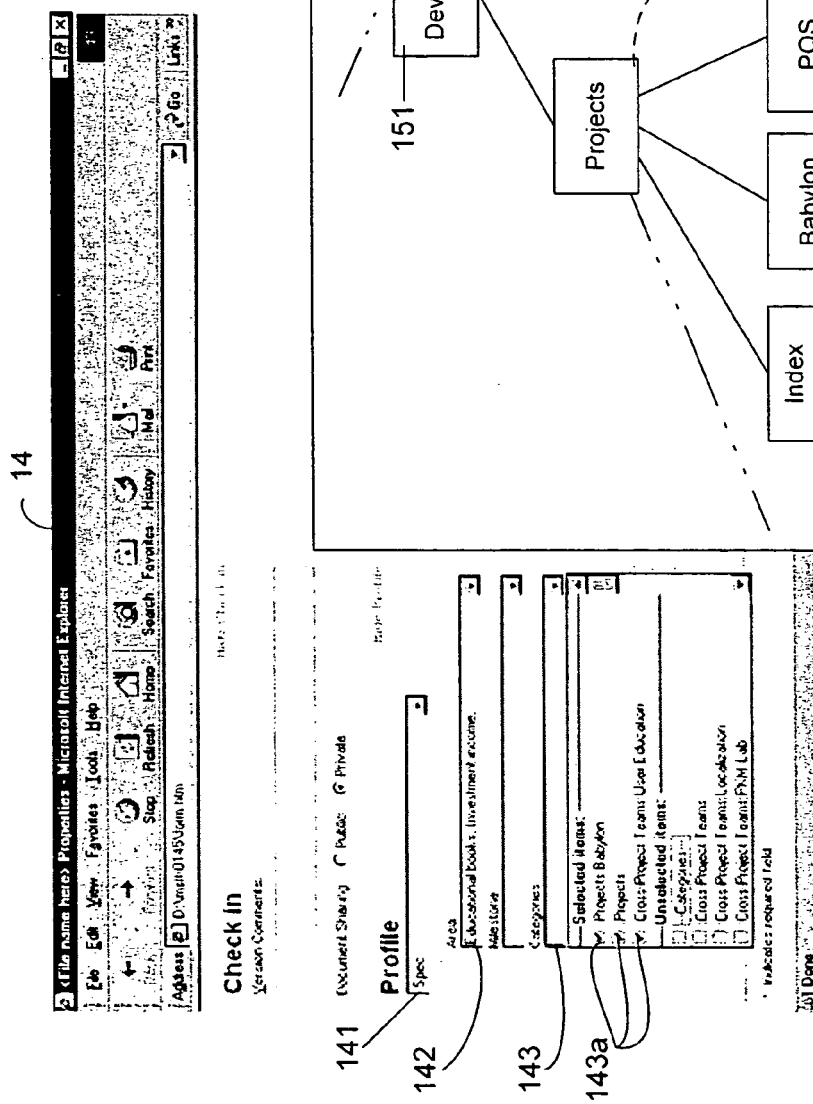
FIG. 6 illustrates the user interface of the invention for use in adding a document to multiple categories within the example categorization tree of FIG. 5.
Figure 6:
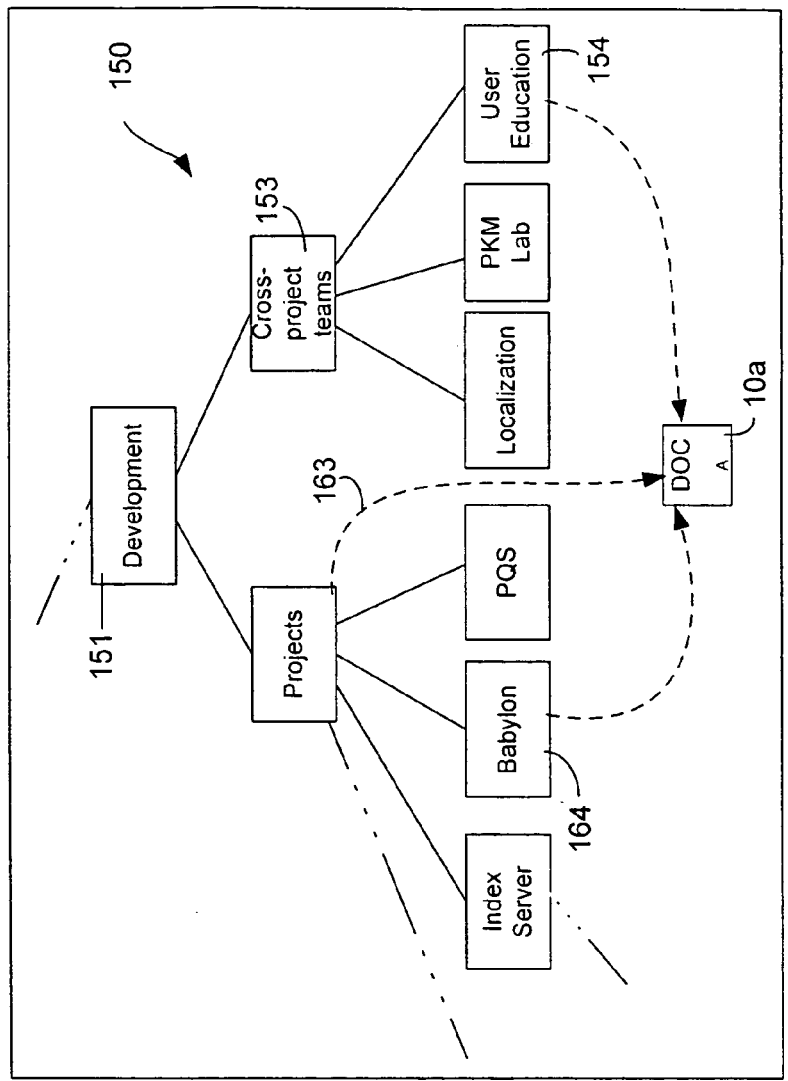

In accordance with the present invention a document may be logically associated with a plurality of categories (i.e. nodes) in the branch/node taxonomy. In such a system users should be encouraged to associate a document with all categories that make logical sense. Thus, as other users search for such documents, they should be able to easily locate it by looking in a category that is logically related to a property of the document. FIG. 6 illustrates the operation of the present invention in facilitating the association of a document with a plurality of categories in the tree 150. According to the invention, the categories in the tree are represented by vocabularies. Each vocabulary term contains at least the label associated with the corresponding node and may contain one or more ancestor categories. A vocabulary term may even correspond to the entire path name of a node. For example, User Education node 154 may represented by the vocabulary term "Cross-project teams:User Education."

As a particular taxonomy grows in size, the number of vocabulary terms will also grow. Hence, a user may have to select logical categories for a document by selecting a large number of vocabulary terms. According to the invention, the vocabulary is provided in a category list 143 having a corresponding check box for each vocabulary term. Preferably, the list is provided in a drop down box. As a user selects vocabulary terms such as by checking the associated check box 143a, the selected term moves to the top of the list of terms, denoted here as "Selected Items."

Figure 7:
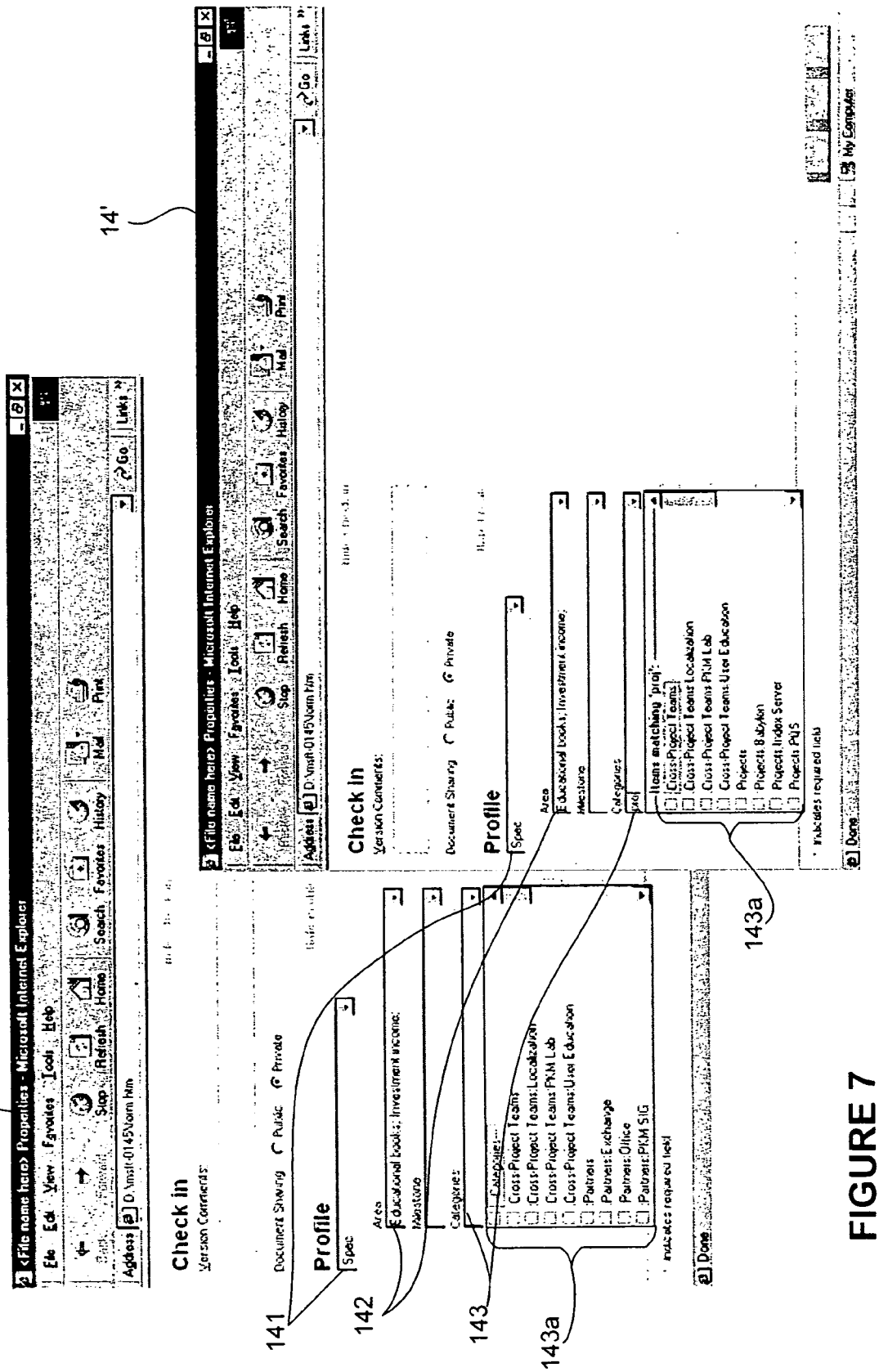
FIG. 7 illustrates an aspect of the user interface of the invention for use in filtering within multiple vocabularies in a list.

FIG. 7 illustrates a further aspect of the invention. To aid in sorting through the potentially enormous number of vocabulary terms, the user may filter the list of terms by entering a match string. If a match string matches any portion of a vocabulary term, that term passes the filter; otherwise the term is filtered out. For example, as shown in window 14, the list of category terms 143a is a sorted dump of the entire list of possible vocabulary terms. However, as illustrated in window 14', if the author is interested in categorizing the document under categories containing "project," by entering "proj" in the Categories box, only those vocabulary terms containing proj are displayed e.g., Projects:Babylon, Cross-Project Teams, and so on. Preferably, previously selected (i.e. checked) vocabulary terms remain at the top of the list, regardless of whether they contain a matching string.

After the user has selected all of the appropriate vocabulary terms, the selected vocabulary terms are preferably transmitted to the server computer 20b (see FIG. 2). Server computer 20b stores the document in DOC storage 70 and associates the document with each selected category node corresponding to the vocabulary term. Thus in the example of FIG. 6, DOC$_A$ 10$a$ will be associated with the nodes "Projects" 163; "Babylon" 164; and "User Education" 154. Thereafter, a user browsing through the tree will find the document by looking in any one of those nodes 163, 164, 154.

While the invention is susceptible to various modifications and alternative constructions, certain illustrated embodiments have been shown in the drawings and accompanying detailed description. It should be understood, however, that there is no intention to limit the invention to the specific constructions disclosed herein. For example, although the user interface system was described in connection with a document management system, the present invention is by no means limited to such as system, but could be useful in any system wherein a user must sort through large lists of items and make multiple selections. As such, the invention is intended to cover all modifications, alternative constructions, and equivalents falling within the scope and spirit of the invention.

What is claimed is:

1. A computer-readable medium having computer-executable instructions for categorizing a document in a document management system, wherein said document management system comprises a tree of nodes, each node having a category label indicative of a document category, the computer-executable instructions performing:

listing a plurality of unique vocabulary terms wherein each vocabulary term represents only one node in said tree and comprises that node's category label;

providing a checkbox for each of the vocabulary terms whereby a user may select at least one vocabulary term by checking a corresponding checkbox; and generating a set of vocabulary terms containing the selected at least one vocabulary term for associating a document with all of the nodes corresponding to the selected vocabulary terms.

2. The computer-readable medium as recited in claim 1, wherein the tree of nodes is provided in a first computer, and wherein the method acts are carried out on a second computer.

3. The computer-readable medium as recited in claim 1, wherein the vocabulary term may comprise a category label corresponding to at least one parent node of the represented node, and wherein the vocabulary term comprises a concatenation of the category label of the represented node and the category label corresponding to the at least on the parent node.

4. The computer-readable medium as recited in claim 3, wherein the concatenated category labels are separated by a text character.

5. The computer-readable medium as recited in claim 1, the computer-executable instructions further performing displaying the list of unique vocabulary terms in a drop-down box.

6. The computer-readable medium as recited in claim 1, wherein vocabulary terms that are checked are moved to the top of the list of unique vocabulary terms.

7. The computer-readable medium as recited in claim 1, wherein the list of unique vocabulary terms may be filtered by inputting a character string whereby on vocabulary terms containing the character string are listed.

* * * * *